Patented Mar. 10, 1936

2,033,480

UNITED STATES PATENT OFFICE 2,033,480

PROCESS OF MAKING RUBBER PRODUCTS

Edward Arthur Murphy, Erdington, England, assignor to Dunlop Rubber Co. Ltd., a British corporation No Drawing. Application February 11, 1932, Serial No. 592,439. In Great Britain February 20, 1931

5 Claims. (Cl. 18—59)

This invention comprises improvements in or relating to the manufacture of goods containing rubber or similar material of the kind hereinafter specified.

The object of the invention is to produce composite articles containing rubber or similar material comprising at least two pieces of different nature wherein one of the pieces consists of a composition, or compositions, of, or containing, rubber or similar material substantially free from fibrous material, and. the other piece consists mainly of fibrous material or materials bonded with a composition or compositions of, or containing, rubber or similar material, the aforesaid pieces being integrally united.

According to the invention the process for the production of the aforesaid composite articles comprises converting aqueous emulsions or dispersions of the kind hereinafter specified in the manner hereinafter indicated into at least two types of dispersions of granular precipitates wherein the one type is to be substantially free from fibrous material and the other type is to consist of fibrous material in admixture with compositions of or containing rubber, and thereafter consolidating by a filtration operation areas built up of at least the two types of the dispersions of granular precipitates aforesaid.

The fibrous materials are admixed with aqueous dispersions of a kind hereinafter specified prior or subsequent to their conversion into dispersions of granular precipitates.

Examples of fibrous materials are, leather fibre, asbestos fibre, wood pulp, wood flour, jute fibre, cotton flock, paper pulp.

The dispersions of granular precipitates of rubber or the like are produced by a process which comprises effecting the coagulation of the aqueous dispersions hereinafter specified by precipitating in situ in the presence of a relatively large quantity of water one or more compounding ingredients of a nature hereinafter described, by the interaction or double decomposition of one or more water soluble reagents having normally no coagulating effects upon the aforesaid dispersions, with one or more water soluble reagents an ion or ions of which may incidentally possess coagulating influence subsequently added thereto, whereupon the aforesaid dispersions are transformed into dispersions of granular precipitates.

Examples of the water soluble reagents of the first class having normally no coagulating effects upon the dispersions are carbonates, sulphates, silicates of the alkali metals or of ammonium.

Examples of the water soluble reagents of the second class which interact with the water soluble reagents of the first class to produce insoluble compounding ingredients are soluble salts of magnesium, aluminum, calcium, barium or zinc; sodium silicate also falls into this class if the corresponding reagent in the first class is such as to precipitate silicic acid—e. g. ammonium carbonate.

By a suitable choice of the reagents and consequent reaction products dispersions of varying consistency can be formed.

If desired the granular dispersions can be washed free from soluble reaction products such as soluble sulphates or chlorides by known means such as filtration and washing prior to their consolidation.

Numerous substances are capable of being used as compounding ingredients, for example, carbonates of magnesium, calcium and zinc may be prepared from sodium carbonate and sulphates or chlorides of these metals. Similarly the silicates of magnesium and zinc can be prepared from sodium silicate and the corresponding sulphate or chloride.

Mixtures of precipitates may be prepared and the reactions may be chosen in such a manner that only one soluble reaction product results for two insoluble products, for example, the reaction between one equivalent of sodium carbonate and one of magnesium sulphate followed by one equivalent of barium chloride yields only one equivalent of sodium chloride for two equivalents of mixed precipitate. In this manner a large yield of precipitate may be obtained relative to the amount of soluble salt to be removed.

The reagents may be added in the form of their aqueous solutions and may contain protective colloids such as glue, gum acacia, in solution to increase the fineness of subdivision of the precipitated compounding ingredients.

The rate at which coagulation takes place after the introduction of the water soluble reagents of the second class may be controlled by the addition of suitable substances, for example casein.

The emulsions or dispersions of rubber or the like comprises those consisting of rubber, guttapercha, balata or similar vegetable resins occurring naturally or artificially obtained. Such artificial aqueous dispersions may include those of coagulated rubber, vulcanized rubber, synthetic rubber, waste or reclaim.

If desired, any of the aforementioned dispersions may be used alone or in admixture with one another. Any of the aforesaid dispersions may contain the usual known compounding and vulcanizing ingredients and/or may be in concentrated form.

Concentrates such as are obtained in U. S. Patent 1,846,164, Feb. 23, 1932, and in British Patent 219,635 to which may be added any one or more of the usual compounding ingredients may also be used.

The aforesaid vulcanizing and other compounding ingredients which are added in the form of their dispersions may be added to the aforesaid aqueous emulsions or dispersions of rubber or the like prior or subsequent to the precipitation of the granular dispersions.

It is preferable to add the aforesaid dispersions of the vulcanizing and other compounding ingredients before the precipitation of the granular dispersions.

As the dispersions of granular precipitates can be compacted by filtration, it is possible to build up composite articles or material such as for example, sheeting in which portions of the sheeting consist of compounded rubber containing no fibrous material and other portions consist of fibrous material bonded with rubber or the like.

It is for instance, possible to produce a composite sheet consisting mainly of a fibrous material such as leather with a facing of compounded rubber, or vice versa. It is also possible to produce sheets in which there is a gradual change in composition from one side of the sheet to the other. This can be effected for instance by pouring a layer of the fibre granular precipitate admixture into a filtering device, this layer being followed by successive layers each containing a lower proportion of fibre than the preceding layer, until the uppermost layer consists wholly of rubber granular precipitate. The composite granular precipitate is then consolidated by filtration aided by suction and pressure. Sheeting can also be produced in which there are local portions of one type of material surrounded by other portions of different composition. For example, the sheet can be prepared consisting of local portions of leather or asbestos compositions surrounded by compounded rubber compositions or vice versa.

The following are given by way of example as to how the process can be effected:—

*Example 1*

A composite sheet consisting mainly of consolidated leather fibre provided with a facing of compounded rubber can be produced in the following manner:—

A thin layer of compounded rubber sludge precipitate is poured on to a filter medium. A thicker layer of a rubber leather fibre sludge is then poured on and suction is applied. A composite cake is thus obtained wherein the consolidated leather layer is intimately bonded to the rubber layer.

The rubber layer can be prepared from latex mixing having the following composition:

Parts by weight
Rubbber used in the form of latex at 65% concentration _____ 75
Colloidal magnesium silicate _____ 25
Casein _____ 0.75

This mixing can be prepared in the following manner:—

Six parts by weight of casein are added in the form of a 5% aqueous ammoniacal solution to 100 parts of concentrated latex of 60% concentration produced by centrifugalization. 26 parts of sodium silicate in the form of a 5% solution are stirred into the latex, and this is followed by the addition of 24 parts of magnesium sulphate also in the form of a 5% solution, which leads to the production of a granular dispersion of compounded rubber.

The sludge containing leather fibre in admixture with rubber can be produced from a latex mixing of the following composition:—

Parts by weight
Rubber _____ 25
Leather dust _____ 75
Colloidal magnesium silicate _____ 5
Casein _____ 1 which can be prepared in the following manner:—2.4 parts by weight of casein in the form of a 5% aqueous ammoniacal solution are added to 100 parts of concentrated latex of 60% concentration produced by centrifugalization. 14.6 parts of sodium silicate in the form of a 5% solution are also added. 14.3 parts of magnesium sulphate as a 5% solution are then stirred in whereupon precipitation occurs. This granular dispersion of rubber and colloidal magnesium silicate is then mixed with 5300 parts of aqueous dispersion of leather fibre having a 3.4% concentration.

*Example 2*

The two types of sludge described in Example 1 can also be used to produce sheet which comprises areas of the one type of material surrounded by areas of the different type of material. In this way, for instance sheet can be prepared consisting of areas of a leather surrounded by areas of a rubber composition. Sheet of this kind can be produced for example by placing a frame shaped in the form, for instance, of the areas which are to be composed of consolidated leather fibres on the shaped filter. The sludge of rubber compositions is poured on to the filter over the area which is not enclosed by the frame. The sludge comprising rubber, leather fibres is then poured over the area enclosed by the frame. The frame may be removed either before or after the application of suction; it must however be removed before complete consolidation takes place. The material so obtained is dried and pressed in the usual manner and consists of fibrous material intimately bonded with the surrounding compositions of compounded rubber.

What I claim is:

1. A method of making a composite article of integrally joined distinct masses of rubber composition which comprises adding an aqueous solution of a reagent having a coagulating ion to an aqueous dispersion of rubber material having dissolved therein a reagent that reacts with said added reagent to form insoluble compounding ingredients and a coagulant to form granular precipitates of compounded cohesible rubber similarly and separately forming a precipitate of cohesible rubber mixed with fibrous material, and forming a coherent structure by filtering said precipitates from the aqueous dispersing medium in distinct contacting masses.

2. A method of making a composite article of integrally joined distinct masses of rubber composition which comprises adding an aqueous solution of a reagent having a coagulating ion to an aqueous dispersion of rubber material having dissolved therein a reagent that reacts with said added reagent to form insoluble compounding ingredients and a coagulant to form granular precipitates of compounded cohesible rubber, similarly and separately forming a precipitate of cohesible rubber mixed with fibrous material forming a coherent structure by filtering said precipitates from the aqueous dispersing medium in distinct contacting masses, and vulcanizing said structure.

3. The method of claim 1 in which said filtered precipitates are deposited in superposed layers.

4. The method of claim 1 in which said masses are filtered in separate areas contacting at the edges of said areas.

5. A method of making a composite article of integrally joined distinct masses of rubber composition which comprises adding an aqueous solution of a reagent having coagulating ions to an aqueous dispersion of rubber containing a dissolved reagent that combines with said added reagent to form solid compounding ingredients and a coagulant, and to thereby form a granular precipitate of compounded cohesible rubber, similarly and separately forming a separate precipitate admixed with solid materials to form a different composition from that first formed, and forming a coherent structure by filtering said precipitates in distinct contacting masses.

EDWARD ARTHUR MURPHY.